United States Patent
Liang

(10) Patent No.: US 7,398,387 B2
(45) Date of Patent: Jul. 8, 2008

(54) DEVICE AND METHOD FOR SCRAMBLING DATA BY MEANS OF ADDRESS LINES

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 815 days.

(21) Appl. No.: 10/826,338

(22) Filed: Apr. 19, 2004

(65) Prior Publication Data

US 2005/0008150 A1 Jan. 13, 2005

(30) Foreign Application Priority Data

Jul. 7, 2003 (TW) .............................. 92118467 A

(51) Int. Cl.
*G06F 1/24* (2006.01)

(52) U.S. Cl. .................. 713/162; 713/168; 713/190

(58) Field of Classification Search .......... 713/162, 713/168, 190

See application file for complete search history.

(56) References Cited

U.S. PATENT DOCUMENTS 5,587,954 A * 12/1996 Vogley et al. ............. 365/221
5,765,197 A * 6/1998 Combs ..................... 711/164

* cited by examiner

*Primary Examiner*—Thomas R Peeso
(74) *Attorney, Agent, or Firm*—Bacon & Thomas, PLLC

(57) ABSTRACT

A device and method for scrambling data by means of address lines is disclosed, which includes a seed generator, a first parameter generator, a data scrambler and a de-scrambler. The seed generator is connected to an address bus for generating a seed in accordance with a specific address on the address bus. The first parameter generator is connected to the seed generator for generating a first parameter based on the seed. The data scrambler is connected to a data bus for scrambling data based on the first parameter when a CPU core is to write the data to the specific address. The de-scrambler is connected to the data bus for de-scrambling the data based on the first parameter when the core is to read the data from the specific address.

13 Claims, 5 Drawing Sheets

DEVICE AND METHOD FOR SCRAMBLING DATA BY MEANS OF ADDRESS LINES

BACKGROUND OF THE INVENTION

1. Field of the Invention

The present invention relates to the technical field of processor and, more particularly, to a device and method for scrambling data by means of address lines in a processor.

2. Description of Related Art

Due to the importance of intellectual properties, manufactories usually scramble their intellectual property (IP), including data and programs, off-line for data protection and store the scrambled data in a non-volatile memory or storage medium, such that an unauthorized person cannot access the data even if he/she obtains the memory or storage medium with the scrambled data.

U.S. Pat. No. 6,408,073 granted to Hsu, et al. for an "Scramble circuit to protect data in a read only memory" discloses a scramble circuit for protecting data stored in a read only memory by applying both a pseudo-random generator and an initial value seed1/seed2 to code ROM data and thus generates encoded data. However, since the scrambling technology uses random numbers as parameters, such a data protection method requires a synchronous random generator for decoding. Therefore program codes cannot be executed directly on such a ROM protected by this method, because any branch or jump in a program may dynamically change the decoding sequence. For example, FIG. 1 shows an exemplary set of program codes that are encrypted with sequential random numbers and stored in a ROM from $1F00\_0000_H$ to $1F00\_0020_H$. When a processor executes the program codes directly, a conditional branch may lead to a problem. That is, after the processor executes the third instruction (i.e., instruction #3 of FIG. 1) representing bz $1F00\_0020_H$ at address $1F00\_000C_H$, it may jump to address $1F00\_0020_H$ for next execution in accordance with the content of zero flag. However, on one hand, data stored in address $1F00\_0020_H$ results in encoding with a number '78' generated by applying a pseudo random generator 20 to instruction #8 of FIG. 1, and on the other hand, the processor decodes data stored in address $1F00\_0020_H$ using value 60 generated by the pseudo random generator at this moment, instead of the value '78' in the encoding process. Accordingly, the program is not executed properly due to the cited error, even the processor may stall. Therefore, applying a random generator or pseudo random generator can protect ROM data only, not for RAM, Flash and the like.

To solve the problem, U.S. Pat. No. 5,943,283 granted to Wong, et al. for an "Address scrambling in a semiconductor memory" uses address scrambling to convert sequential input addresses into non-sequential physical addresses, thus achieving data protection for RAM or Flash. However, if the stored data has significant sequencing pattern (e.g., Boot-up Strap procedure for a processor, or common function tables), data protection used can easily be cracked by guessing data disposition.

Therefore, it is desirable to provide an improved data protection method to mitigate and/or obviate the aforementioned problems.

SUMMARY OF THE INVENTION

The object of the present invention is to provide a device and method for scrambling data by means of address lines in a processor, which can protect RAM and Flash data, thereby avoiding the prior problem that only sequential ROM data can be protected.

In accordance with one aspect of the present invention, there is provided a device for scrambling data by means of address lines in a processor. The processor has a CPU core to execute instructions of the processor and to access data through an address bus and a data bus. The device includes a seed generator, a first parameter generator, a data scrambler and a de-scrambler. The seed generator is connected to an address bus for generating a seed in accordance with a specific address on the address bus. The first parameter generator is connected to the seed generator for generating a first parameter based on the seed. The data scrambler is connected to a data bus for scrambling data based on the first parameter when a CPU core is to write the data to the specific address. The de-scrambler is connected to the data bus for de-scrambling the data based on the first parameter when the CPU core is to read the data from the specific address.

In accordance with another aspect of the present invention, there is provided a method for scrambling data by means of address lines in a processor. The processor has a CPU core to execute instructions of the processor and access data through an address bus and a data bus. The method includes steps: a seed generation step which generates a seed in accordance with a specific address on the address bus; a first parameter generation step which generates a first parameter based on the seed; a data scramble step which scrambles data based on the first parameter when a CPU core is to write the data to the specific address; and a de-scramble step which de-scrambles the data based on the first parameter when the CPU core is to read the data from the specific address.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
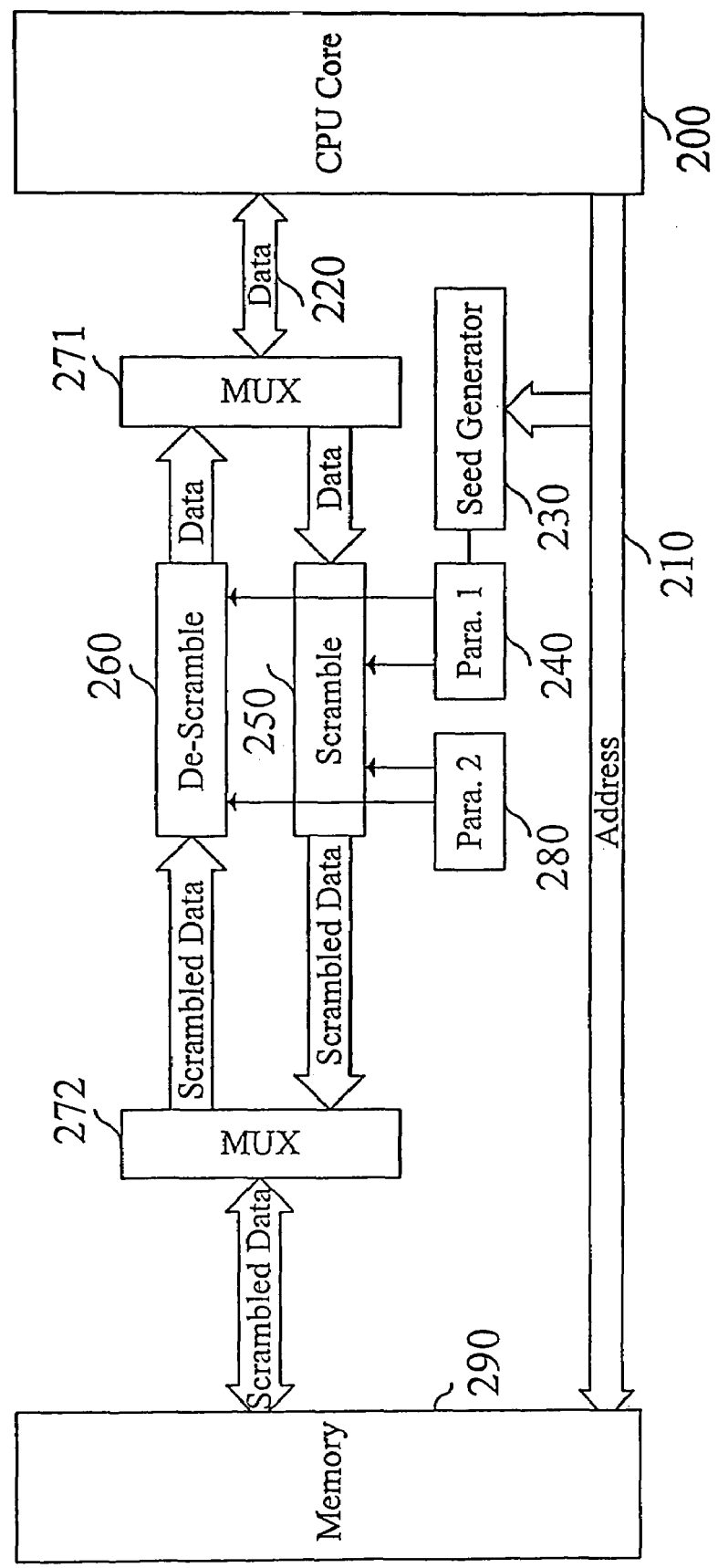
FIG. 2 is a block diagram of an exemplary device for scrambling data by means of address lines in a processor in accordance with the invention.

FIG. 2 is a block diagram of an exemplary device for scrambling data by means of address lines in a processor in accordance with the invention. As shown, a CPU core 200 executes instructions of a processor and accesses data in a memory 290 through an address bus 210 and a data bus 220. The device for scrambling data by means of address lines in a processor includes a seed generator 230, a first parameter generator 240, a data scrambler 250, a de-scrambler 260, selectors 271, 272 and a second parameter generator 280.

The seed generator 230 is connected to the address bus 210. When the CPU core 200 uses the address bus 210 and the data bus 220 to access data in the memory 290. The seed generator 230 randomly generates a seed based on entire or partial address on the address bus 210. The first parameter generator 240 is connected to the seed generator 230 to generate a first parameter based on the seed.

The selector 271 is connected to the data bus 220. When the CPU core 200 is to write data, the selector 271 selects data to be written to the data scrambler 250 for scrambling. When the CPU core 200 is to read data, the selector 271 selects data de-scrambled by the de-scrambler 260 to the CPU core 200.

The selector 272 is connected to data bus of the memory 290. When the CPU core 200 is to write data, the selector 272 selects data scrambled by the data scrambler 250 to the data bus of the memory 290. When the CPU core 200 is to read data, the selector 272 selects data to be read to the de-scrambler 260 for de-scrambling.

The data scrambler 250 is connected to the selector 271. When the CPU core 200 is to write data to a specific address of the memory 290, the data scrambler 250 scrambles the data based on the first parameter generated by the first parameter generator 240. The scrambled data is sent to the data bus of the memory 290 through the selector 272.

The de-scrambler 260 is connected to the selector 272. When the CPU core 200 is to read data from a specific address of the memory 290, the de-scrambler 260 de-scrambles the data based on the first parameter generated by the first parameter generator 240. The de-scrambled data is sent to the CPU core 200 through the selector 271 and the data bus 220.

Figure 1:
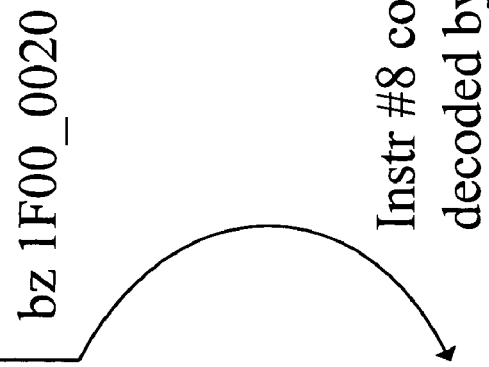
FIG. 1 is a schematic flow of encoding a program based on an initial value by a prior pseudo random generator.
Figure 3:
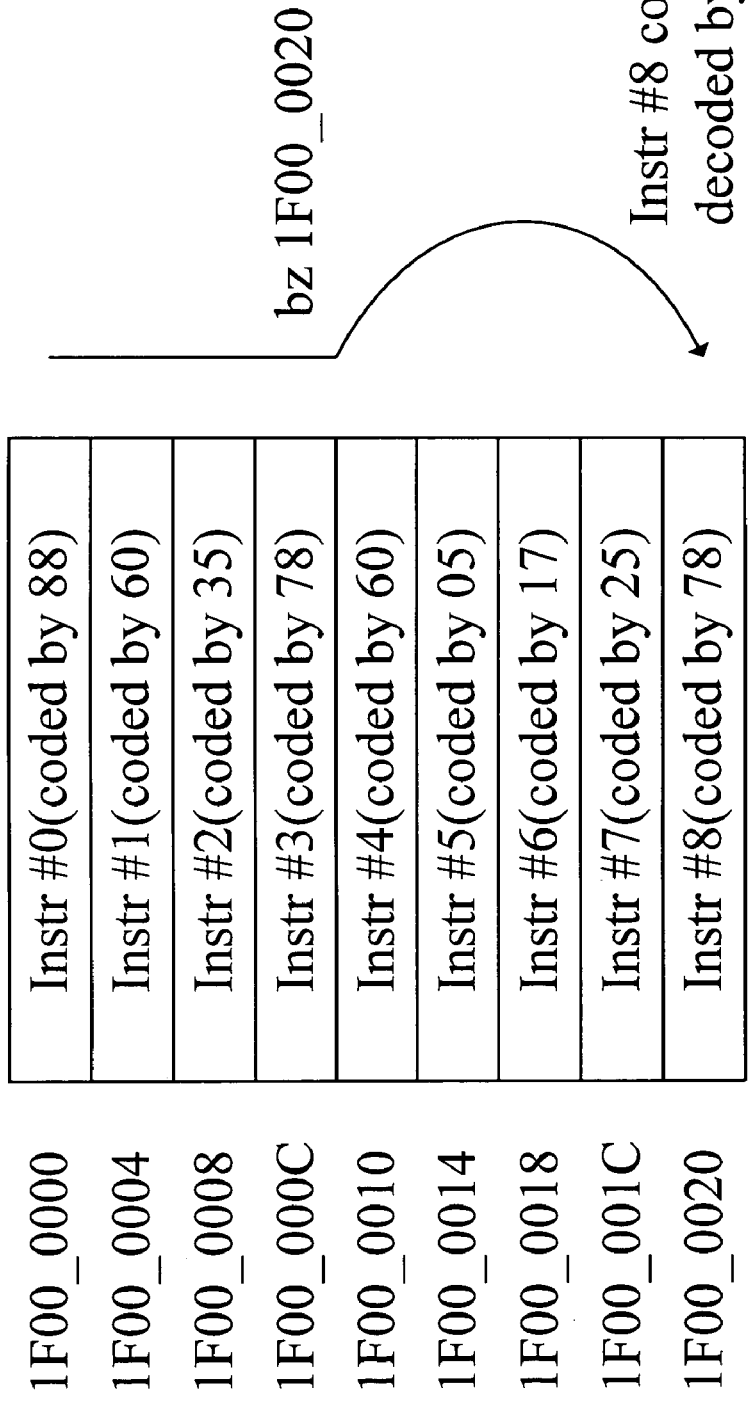
FIG. 3 is a schematic flow of encoding the program of FIG. 1 in accordance with the invention.

FIG. 3 is a schematic flow of encoding the program of FIG. 1 in accordance with the invention. As shown, program codes are pre-encrypted by the inventive data scrambler 250 and stored in a ROM from $1F00\_0000_H$ to $1F00\_0020_H$. Seed that generated by the seed generator 230 is the address line Address [5:2] belong to a part of the address bus 210. The first parameter generator 240 is connected to the seed generator 230 to generate a first parameter based on the seed. The first parameter generator 240 in this embodiment can be a lookup table, as shown in table 1, where x is seed generated by the seed generator 230, F1(x) is first parameter generated by the first parameter generator 240.

TABLE 1

| x | 0 | 1 | 2 | 3 | 4 | 5 | 6 | 7 | 8 | ... |
|---|---|---|---|---|---|---|---|---|---|---|
| F1 (x) | 88 | 60 | 35 | 78 | 60 | 05 | 17 | 25 | 78 | ... |

When address is $1F00\_0004_H$, we have seed=Address[5:2]=1, and first parameter Parameter1=F1(1)=60. Table 1 is an example of the first parameter generator 240 for illustrative purpose only. It is possible that the first parameter generator 240 may generate other than 0~8 fields, and may be other corresponding functions.

In the case of instruction #3=bz $1F00\_0020_H$, when executing instruction #3 on address $1F00\_000C_H$, the processor determines to jump to address $1F00\_000C_H$ based on the content of a zero flag for next execution. Accordingly, the processor fetches scrambled data instruction #8 on address $1F00\_0020_H$. Since the scrambled data is de-scrambled by the de-scrambler 260, instruction #8 is obtained accurately. This avoids decoding data on address $1F00\_0020_H$ with an error value of 60 in the prior art.

The seed generator 230 randomly generates a seed, and even so, when the CPU core 200 is to access data on a specific memory address, the seed generator 230 generates a seed in accordance with address on the address bus 210. Accordingly, data on a same specific memory address can be accessed with a same seed, which presents a one-to-one relation that prevents the problem indicated by FIG. 1. Therefore, the invention can protect ROM, RAM and Flash data.

In addition, to increase data scrambled randomness and thus prevent obtaining the scrambling by others, as shown in FIG. 2, the invention further applies a second parameter generator 280 to generate a second parameter. Based on the first and second parameters, the data scrambler 250 performs scrambling and the de-scrambler 260 performs de-scrambling.

Figure 4:
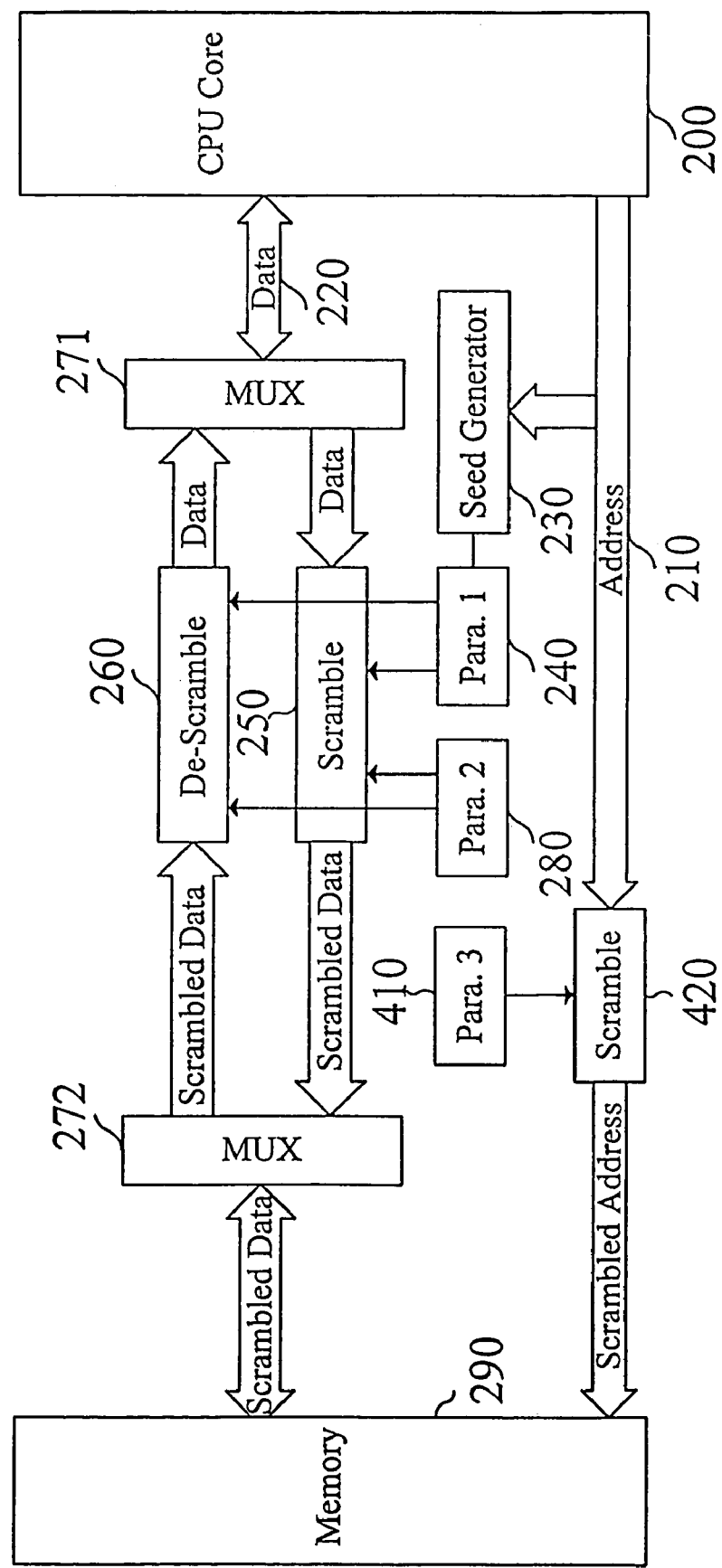
FIG. 4 is a block diagram of another exemplary device for scrambling data by means of address lines in a processor in accordance with the invention.
Figure 5:
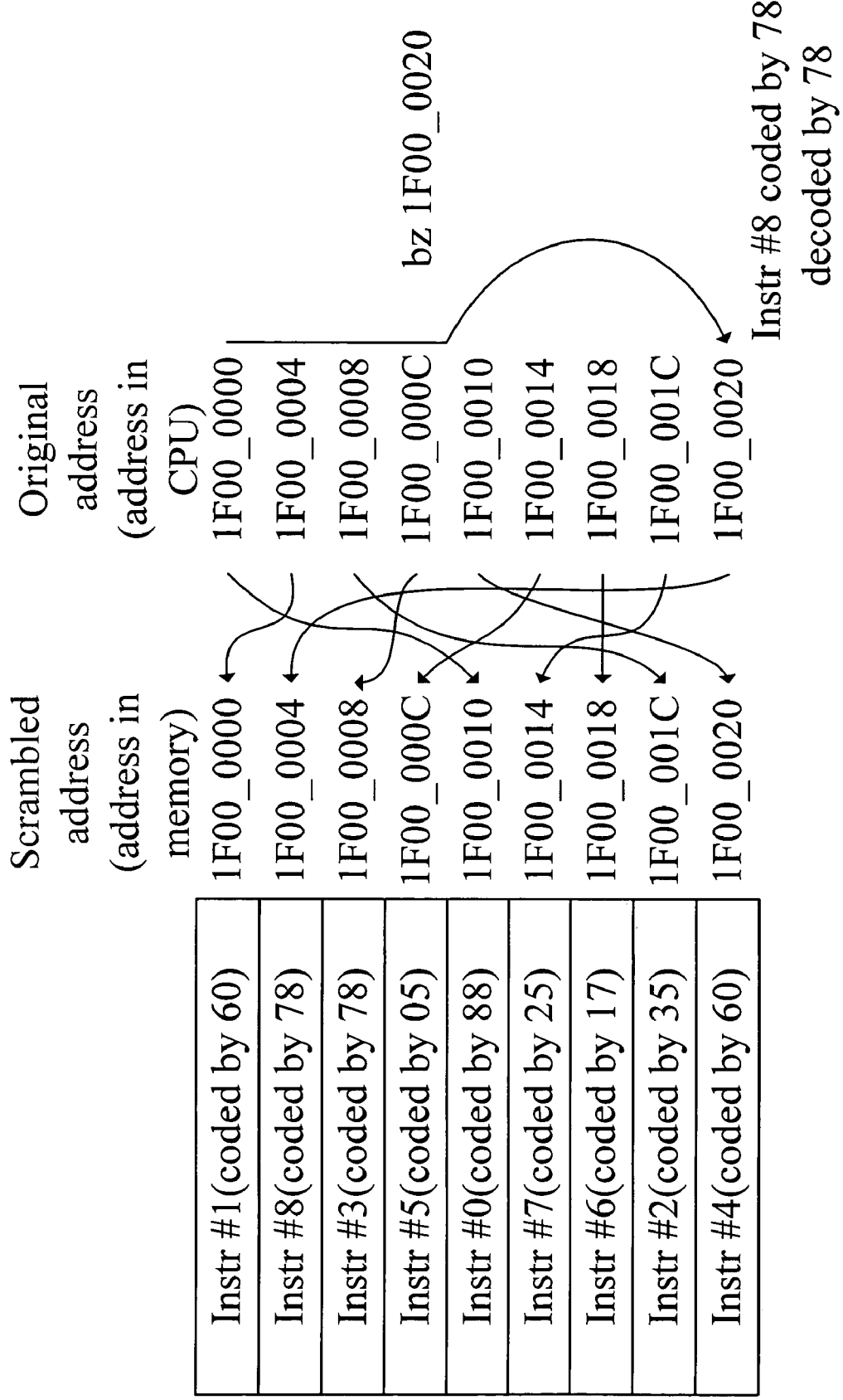
FIG. 5 is a schematic flow of scrambling data store addresses shown in FIG. 3 in accordance with the invention.

To enhance randomness for an access address of data, as shown in FIG. 4, the invention further includes both a third parameter generator 410 and an address scrambler 420 to perform address scrambling. The third parameter generator 410 generates a third parameter. The address scrambler 420 is connected to the address bus. When the CPU core 200 is to access data on a specific address, the address scrambler 420 scrambles addresses of the CPU core 200 based on the third parameter. FIG. 5 is a schematic flow of using the address scrambler 420 to scramble store addresses of the codes of FIG. 3. As shown in FIG. 5, codes stored in memory lacks of correlation between before and after address scrambling and thus it is difficult for an unauthorized person having the memory to obtain original program codes.

In view of foregoing, it is known that the invention performs data scrambling/reverse scrambling in accordance with a unique access address and thus obtains accurate instructions or data. Therefore, the invention can be applied in data protection for RAM, Flash and the like, in addition to ROM.

Although the present invention has been explained in relation to its preferred embodiment, it is to be understood that many other possible modifications and variations can be made without departing from the spirit and scope of the invention as hereinafter claimed.

What is claimed is:

1. A device for scrambling data by means of address lines, the processor having a CPU core to execute instructions of the processor and to access data through an address bus and a data bus, the device comprising:

a seed generator, connected to an address bus, for generating a seed in accordance with a specific address on the address bus;

a first parameter generator, connected to the seed generator, for generating a first parameter based on the seed;

a data scrambler, connected to a data bus, for scrambling data based on the first parameter when a CPU core is to write the data to the specific address;

a de-scrambler, connected to the data bus, for de-scrambling the data based on the first parameter when the CPU core is to read the data from the specific; and a second parameter generator to generate a second parameter, wherein the data scrambler performs scrambling based on the first parameter and the second parameter, and the de-scrambler performs de-scrambling based on the first parameter and the second parameter.

2. The device as claimed in claim 1, further comprising a selector, wherein when the CPU core is to write data, the selector selects data to be written to the data scrambler for scrambling and writes scrambled data to a memory, and when the CPU core is to read data, the selector selects data to be read to the de-scrambler for de-scrambling and sends the de-scrambled data to the CPU core.

3. The device as claimed in claim 1, further comprising
a third parameter generator to generate a third parameter; and an address scrambler, connected to the address bus, for scrambling addresses of the CPU core based on the third parameter when the CPU core is to access data on a specific address.

4. The device as claimed in claim 3, wherein the address scrambler performs scrambling based on entire or partial address on the address bus and thus generates a scrambled address.

5. The device as claimed in claim 4, wherein the address line number on the address bus equals to the address line number after the scrambling.

6. The device as claimed in claim 4, wherein the address line number on the address bus is not equal to the address line number after the scrambling.

7. The device as claimed in claim 1, wherein the seed generator generates a seed based on entire or partial address on the address bus.

8. A method for scrambling data by means of address lines, the processor having a CPU core to execute instructions of the processor and to access data through an address bus and a data bus, the method comprising steps:
   a seed generation step, which generates a seed in accordance with a specific address on the address bus;
   a first parameter generation step, which generates a first parameter based on the seed;
   a second parameter generation step, which generates a second parameter;
   a data scramble step, which scrambles data based on the first parameter and the second parameter when a CPU core is to write the data to the specific address; and
   a de-scramble step, which de-scrambles the data based on the first parameter and the second parameter when the CPU core is to read the data from the specific address.

9. The method as claimed in claim 8, further comprising:
   a third parameter generation step, which generates a third parameter; and
   an address scramble step, which performs scrambling address of the CPU core based on the third parameter when the CPU core is to access data on a specific address.

10. The method as claimed in claim 9, wherein the address scramble step performs scrambling based on entire or partial address on the address bus and thus generates a scrambled address.

11. The method as claimed in claim 10, wherein the address line number on the address bus equals to the address line number after the scrambling.

12. The method as claimed in claim 10, wherein the address line number on the address bus is not equal to the address line number after the scrambling.

13. The method as claimed in claim 8, wherein the seed generation step generates a seed based on entire or partial address on the address bus.

* * * * *